US006973732B1

(12) United States Patent
Chang

(10) Patent No.: US 6,973,732 B1
(45) Date of Patent: *Dec. 13, 2005

(54) MAGNETIC COMPASS

(76) Inventor: Gin-Sung Chang, No. 15, Lane 385, Kuang Ming Rd., Wu Jih Hsiang, Taichung Hsien (TW) 414

( * ) Notice: Subject to any disclaimer, the term of this patent is extended or adjusted under 35 U.S.C. 154(b) by 0 days.

This patent is subject to a terminal disclaimer.

(21) Appl. No.: 10/862,571

(22) Filed: Jun. 8, 2004

(51) Int. Cl.7 .............................................. G01C 17/24
(52) U.S. Cl. ...................................... 33/355 R; 33/348
(58) Field of Search ....................... 33/272, 348, 348.2, 33/354, 364, 355 R; 362/23, 29, 30, 109, 362/119, 253; 429/97, 100

(56) References Cited

U.S. PATENT DOCUMENTS 3,181,974 A * 5/1965 La Barben .................. 429/100
4,438,568 A * 3/1984 Kramer et al. ................ 33/348
5,922,489 A * 7/1999 Adachi ....................... 429/100
6,145,209 A * 11/2000 Chang ......................... 33/348
D462,020 S * 8/2002 Chang ......................... D10/68
6,527,584 B2 * 3/2003 Ninomiya ................... 439/500
6,578,277 B1 6/2003 Chang ...................... 33/355 R
6,603,670 B1 * 8/2003 Chien ......................... 361/801
2005/0068764 A1 * 3/2005 Chen .......................... 362/119

* cited by examiner

*Primary Examiner*—R. Alexander Smith
(74) *Attorney, Agent, or Firm*—Bacon & Thomas, PLLC

(57) ABSTRACT

A magnetic compass includes a base having a receiving chamber for receiving a compass body, a battery chamber for receiving a battery set, an illuminant chamber for receiving an illuminant, and a locating chamber for receiving an electrically conductive member. The illuminant has a first terminal suspended above the battery set. A push button is supported on the first terminal of the illuminant for pressing by the user to force the first terminal of the illuminant downwards into contact with a first terminal of the battery set. The conductive member has a base frame mounted in the locating chamber, and a contact portion extended from the base frame and inserted into the battery chamber and pressed on a second terminal of the battery set. A second terminal of the illuminant is electrically connected to the base frame of the conductive member.

4 Claims, 7 Drawing Sheets

MAGNETIC COMPASS

BACKGROUND OF THE INVENTION

1. Field of the Invention

The present invention relates to a magnetic compass and more particularly, to such a magnetic compass that is usable in the dark.

2. Description of the Related Art

FIG. 6 is an exploded view of a magnetic compass 80 constructed according to U.S. Pat. No. 6,578,277. According to this design, the magnetic compass 80 comprises a compass body 81, an illuminant 82, a conductive copper ring 83, a battery set 84 (which is consisted of a plurality of flat cylindrical lithium batteries that are stacked one by one), a base 85, a top lid 86, and a push button 87. The base 85 comprises a receiving chamber 851 that accommodates the compass body 81, a battery chamber 852 that accommodates the conductive copper ring 83, and an illuminant chamber 853 that accommodates the illuminant 82. The battery set 84 is situated within the conductive copper ring 83. The illuminant 82 comprises a first terminal 821 suspending above the battery set 84 and a second terminal 822 electrically connected to the conductive copper ring 83. The top lid 86 is covered on the base 85, having a button hole 861 corresponding to the battery chamber 852. The push button 87 is mounted in the button hole 861 of the top lid 86 and supported on the first terminal 821 of the illuminant 82. When pressed the push button 87, the first terminal 821 of the illuminant 82 is forced into contact with the battery set 84, thereby closing the circuit of the battery set 84 and the illuminant 82, and therefore the illuminant 82 is turned on to emit light toward the periphery of the compass body 81. Therefore, the magnetic compass 80 is effectively usable under low light conditions.

Referring to FIG. 7 and FIG. 6 again, the inner diameter of the conductive copper ring 83 is greater than the outer diameter of the battery set 84 so that the battery set 84 can conveniently be put into or taken out of the battery chamber 852. However, the presence of a gap between the conductive copper ring 83 and the battery set 84 may cause contact failure, thereby resulting in unstable supply of electricity to the illuminant 82.

SUMMARY OF THE INVENTION

The present invention has been accomplished under the circumstances in view. It is the main object of the present invention to provide a magnetic compass that provides a stable illumination effect.

To achieve this object of the present invention, the magnetic compass comprises a base, a compass body, a battery set, an illuminant, a push button and an electrically conductive member. The base includes a hollow base body and a top cover covering the hollow base body. The hollow base body has a receiving chamber for receiving the compass body, a battery chamber for receiving the battery set, an illuminant chamber for receiving the illuminant, and a locating chamber for receiving the conductive member. The top cover has a through hole corresponding to the battery chamber. The illuminant has a first terminal suspended above the battery set. The push button is supported on the first terminal of the illuminant and movably mounted in the through hole of the top cover for pressing by the user to force the first terminal of the illuminant downwards into contact with a first terminal of the battery set. The conductive member has a base frame mounted in the locating chamber, and a contact portion extended from the base frame and inserted into the battery chamber and pressed on a second terminal of the battery set. A second terminal of the illuminant is electrically connected to the base frame of the conductive member.

DETAILED DESCRIPTION OF THE INVENTION

Figure 1:
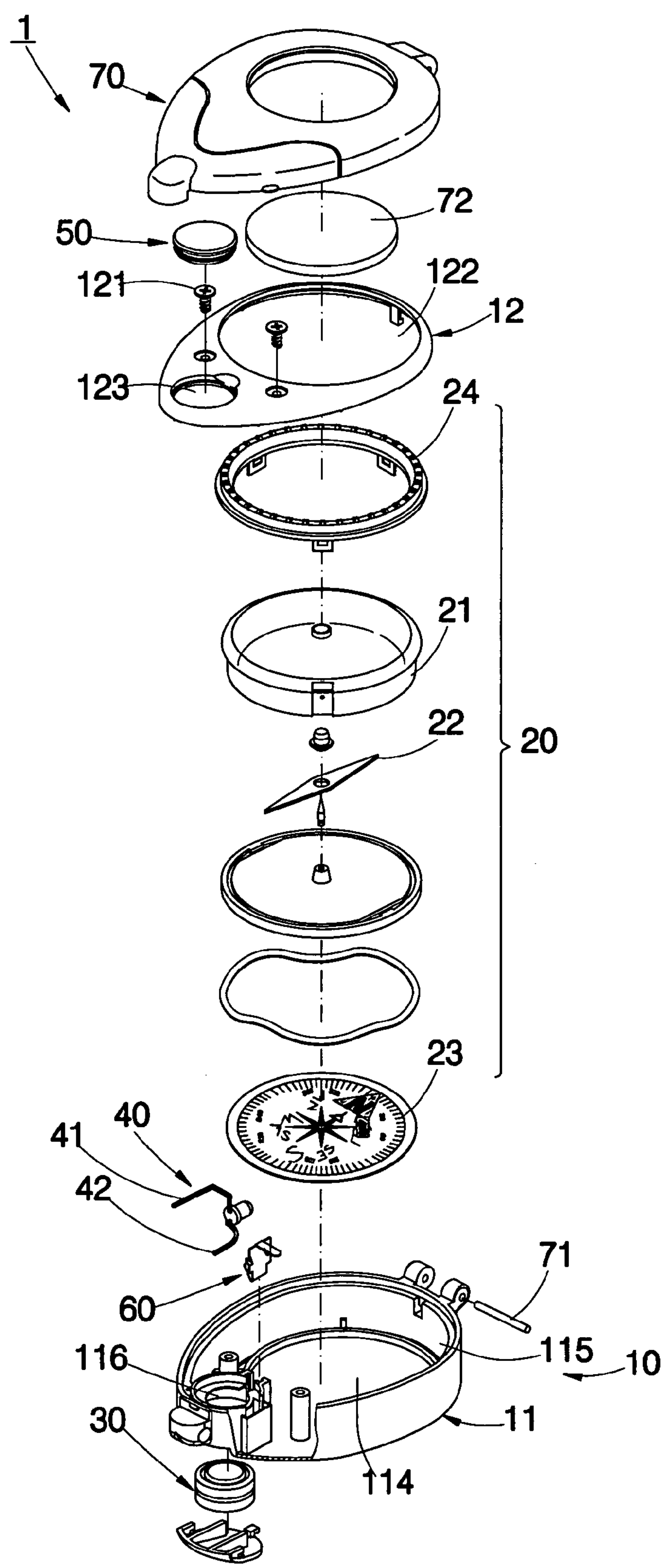
FIG. 1 is an exploded view of a magnetic compass according to the present invention.

Referring to FIG. 1, a magnetic compass 1 is shown comprised of a base 10, a compass body 20, a battery set 30, an illuminant 40, a push button 50, an electrically conductive member 60, and a top lid 70. The base 10 comprises a hollow base body 11 and a top cover 12 covering the hollow base body 11.

Figure 2:
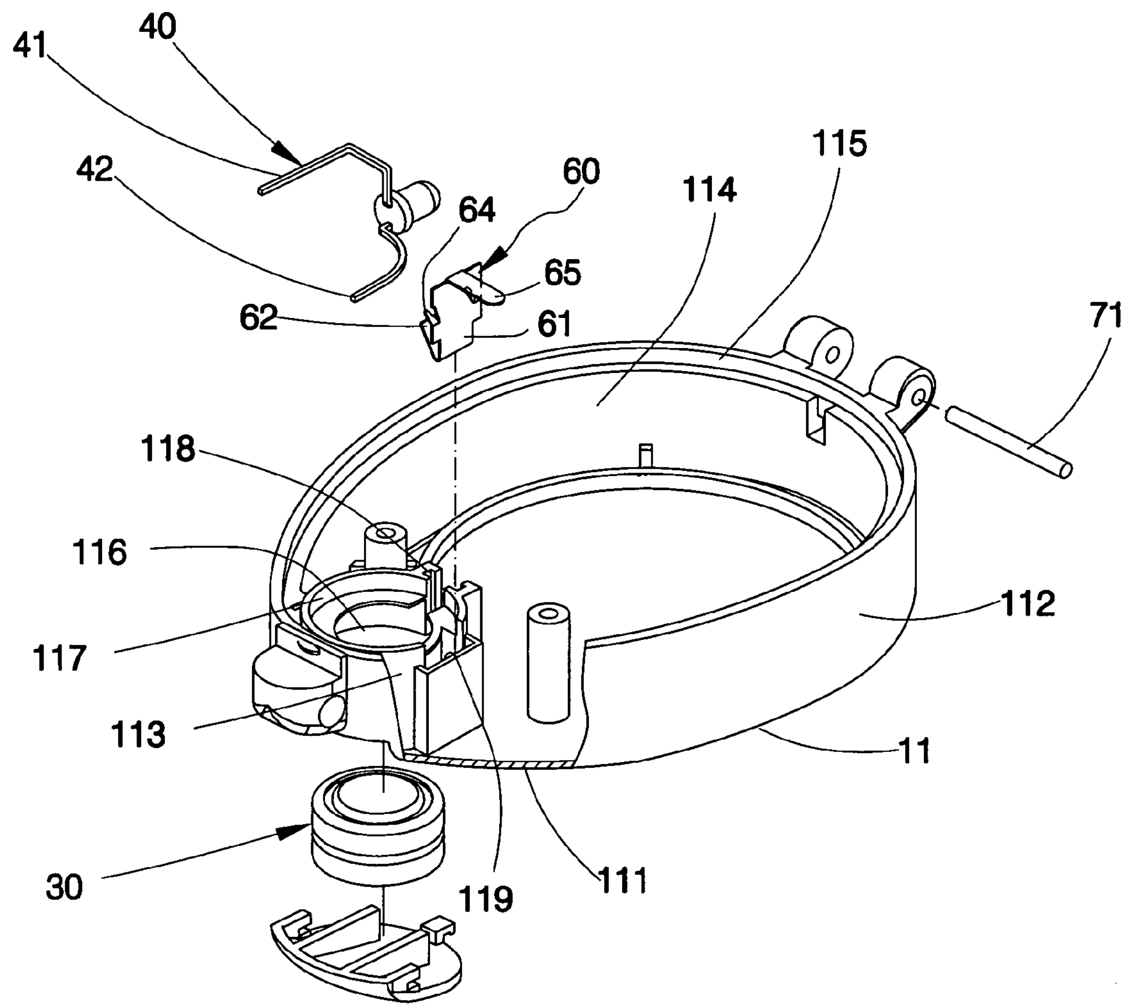
FIG. 2 is an enlarged view of a part of FIG. 1.
Figure 3:
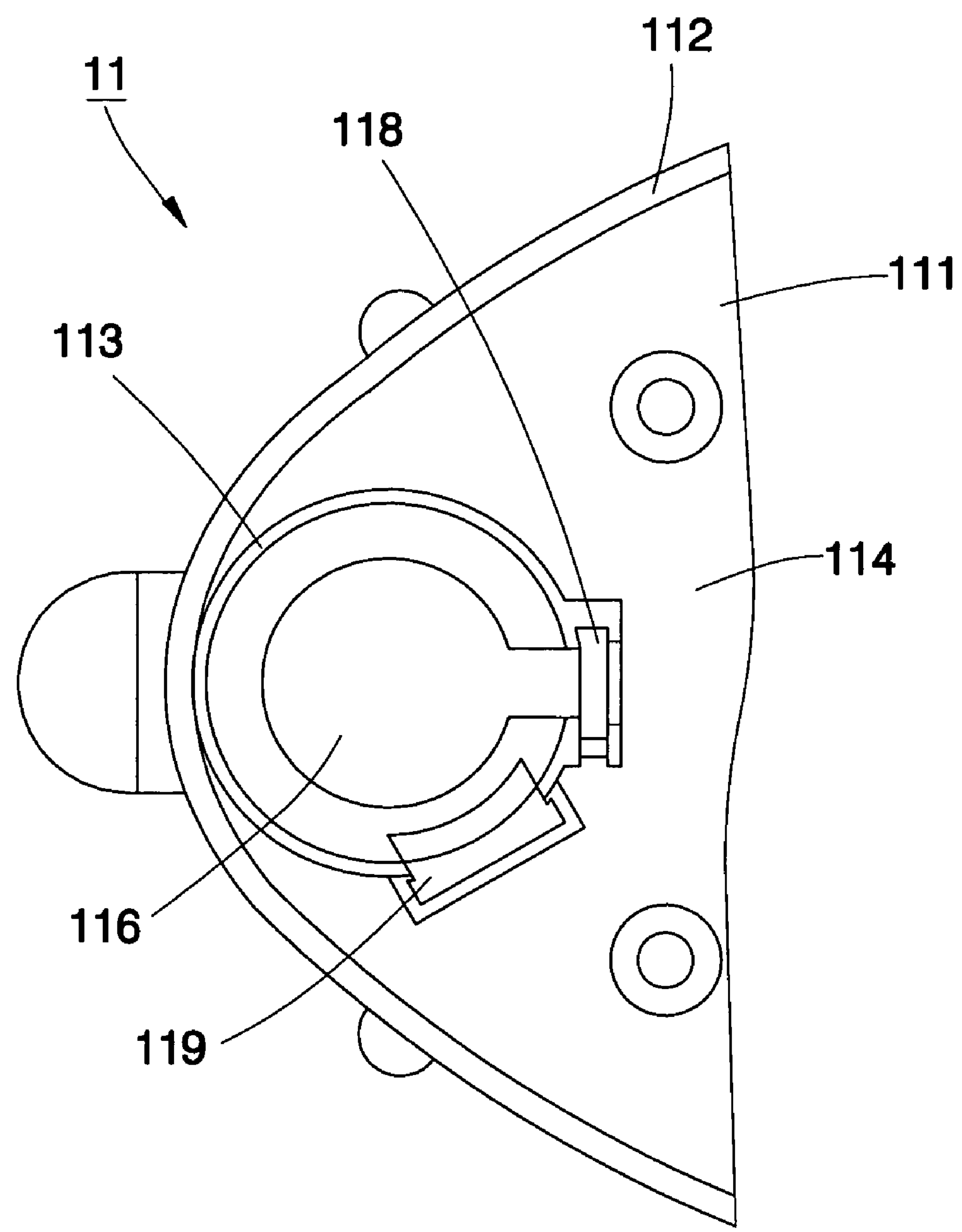
FIG. 3 is a top view in an enlarged scale of a part of the bas of the magnetic compass according to the present invention.

Referring to FIGS. 2 and 3 and FIG. 1 again, the hollow base body 11 comprises a bottom wall 111, an upright peripheral wall 112 perpendicularly extended around the border of the bottom wall 111, a barrel 113 perpendicularly upwardly extended from the bottom wall 111 and peripherally partially formed integral with the upright peripheral wall 112, a receiving chamber 114 surrounded by the upright peripheral wall 112 outside the barrel 113, a top opening 115 in the top side of the receiving chamber 114, a battery chamber 116 surrounded by the barrel 113, a battery insertion opening 117 in the top side of the battery chamber 116, an illuminant chamber 118 formed integral with the periphery of the barrel 113 in communication between the receiving chamber 114 and the battery chamber 116, and a locating chamber 119 formed integral with the periphery of the barrel 113 in communication with the battery chamber 116. The top cover 12 is fastened to the hollow base body 11 with screws 121 to close the top opening 115 of the hollow base body 11, having a view window 122 corresponding to the receiving chamber 114 and a through hole 123 corresponding to the battery chamber 116 (see FIG. 1).

The compass body 20 is situated within the receiving chamber 114 of the hollow base body 11 of the base 10, comprising a housing 21, a magnetic needle 22 pivotally mounted within the housing 21, an indication card 23 adhered to the top surface of the bottom wall of the housing 21, and an ornamental ring 24 fastened to the top side of the housing 21.

The battery set 30 is comprised of two flat cylindrical lithium batteries, which are arranged in a stack (electrically connected in series), and mounted within the battery chamber 115 with one terminal, for example, the positive terminal aimed at the battery insertion opening 117.

Figure 4:
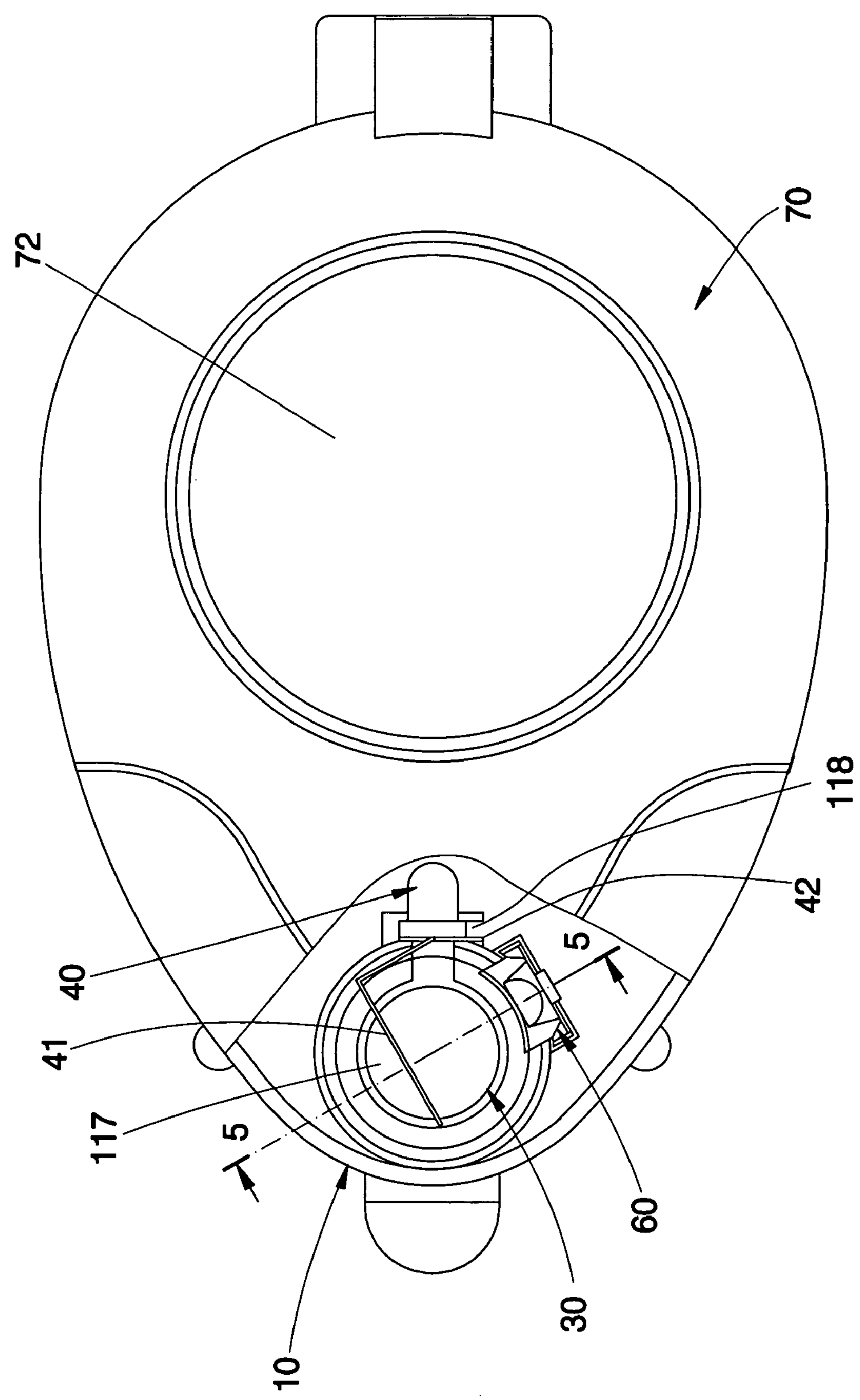
FIG. 4 is a top view in an enlarged scale of the magnetic compass according to the present invention.
Figure 5:
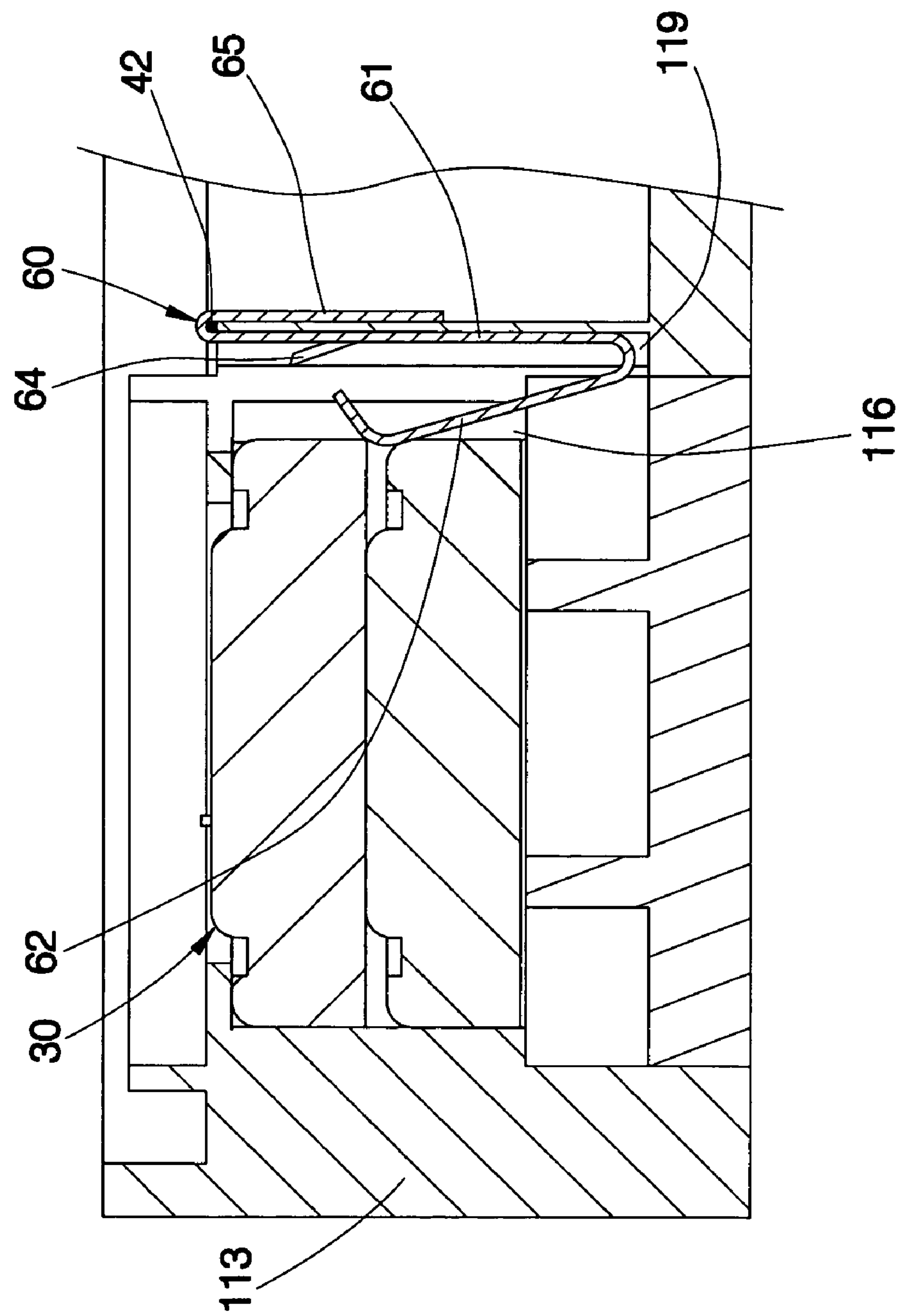
FIG. 5 is a sectional view taken along line 5—5 of FIG. 4.
Figure 6:
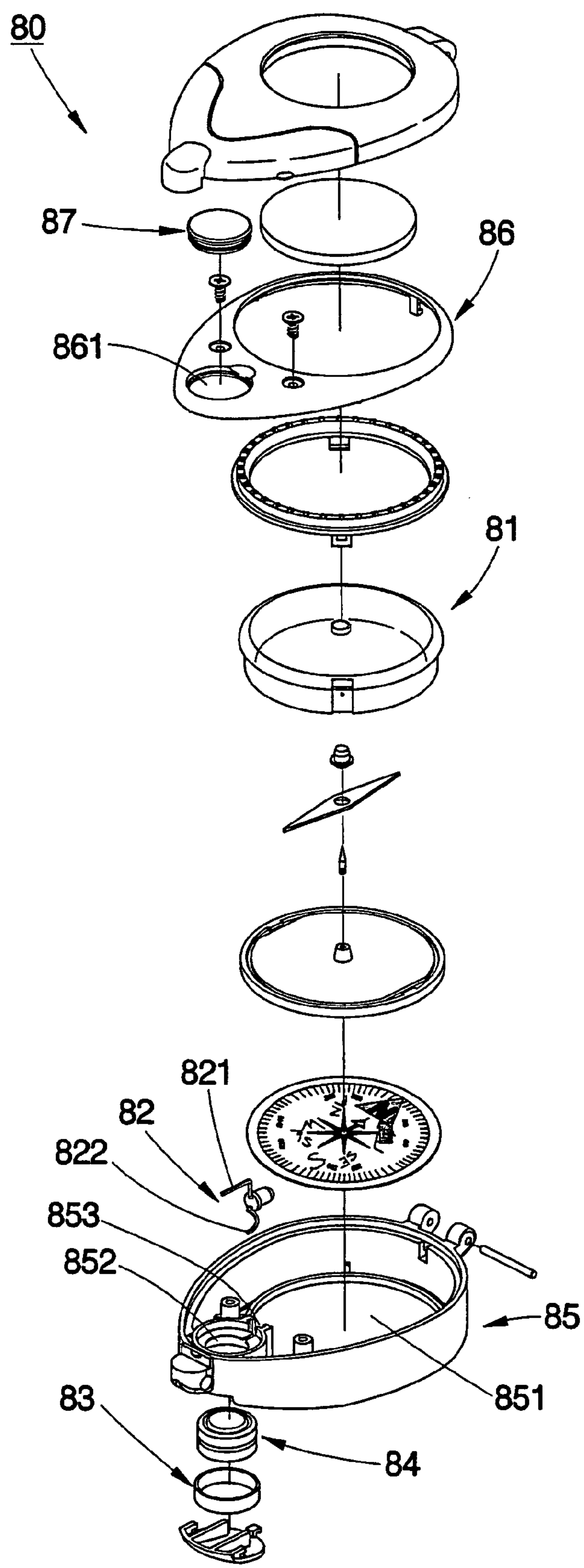
FIG. 6 is an exploded view of a magnetic compass constructed according to U.S. Pat. No. 6,578,277.
Figure 7:
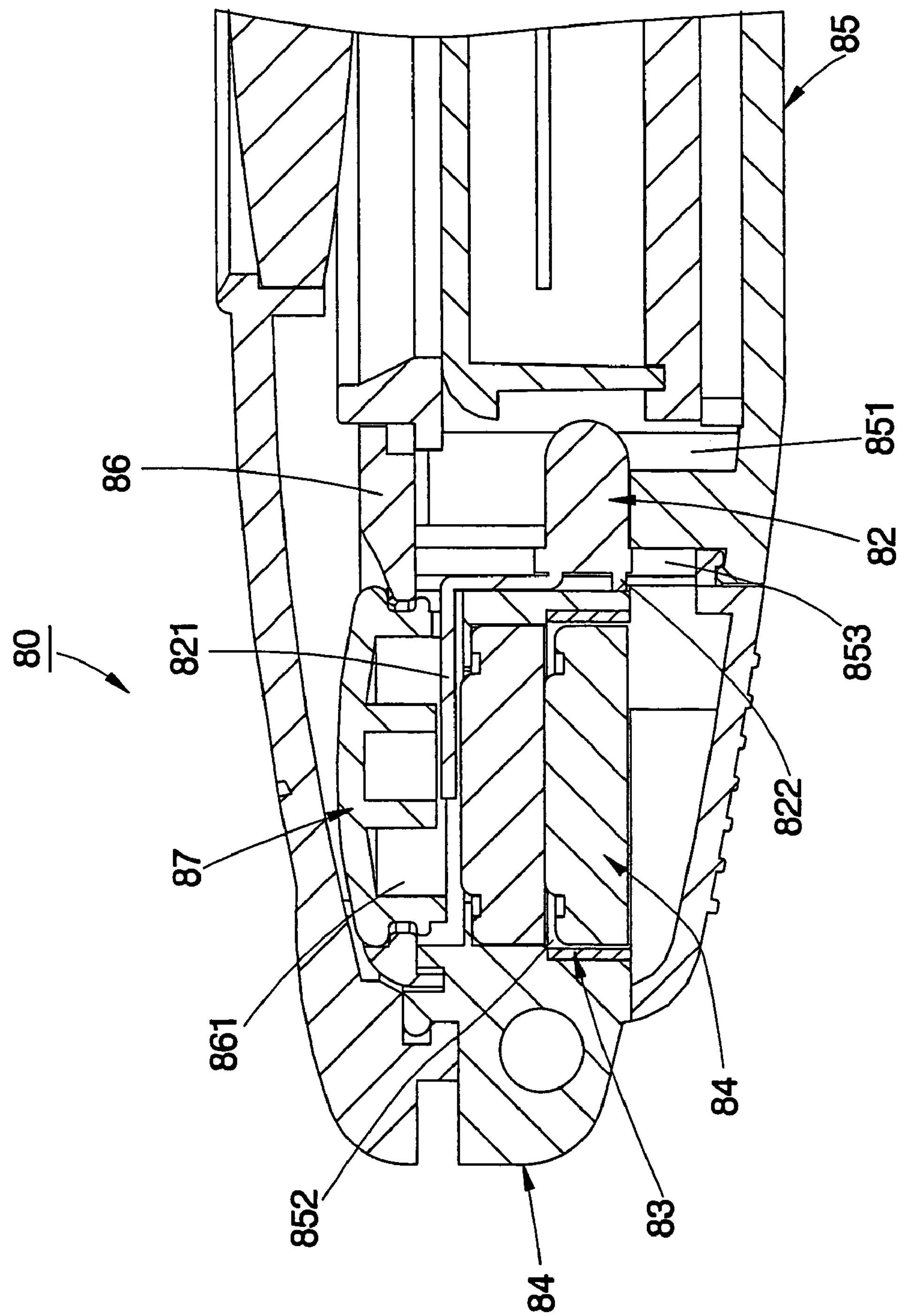
FIG. 7 is a sectional view in an enlarged scale of a part of the magnetic compass shown in FIG. 6.

Referring to FIGS. 4 and 5, the illuminant 40 according to the present preferred embodiment is an LED (light emitting diode) situated within the illuminant chamber 118 and aimed at the periphery of the compass body 20, having a first terminal 41 suspended in the battery insertion opening 117 and a second terminal 42 suspended in the top side of the locating chamber 119.

The push button 50 is supported on the first terminal 41 of the illuminant 40 above the battery chamber 116 and partially inserted through the through hole 123 of the top cover 12 to the outside of the base 10 for pressing by the user to force the first terminal 41 of the illuminant 40 downwards into contact with the positive terminal of the battery set 30.

Referring to FIG. 5 again, the electrically conductive member 60 made of metal comprises a flat rectangular base frame 61 mounted in the locating chamber 119, a contact portion 62 extended from the bottom side of the flat rectangular base frame 61 and curved upwardly outwards toward the inside of the battery chamber 116 and pressed on the other terminal, namely, the negative terminal of the battery set 30, two protruding strips 64 respectively upwardly extended from two opposite lateral sides of the flat rectangular base frame 61 on the middle and respectively stopped against the inside wall of the locating chamber 119 at one side to force the flat rectangular base frame 61 against the inside wall of the locating chamber 119 at the other side, and a locating strip 65 outwardly extended from the top side of the flat rectangular base frame 61 and curved backwards to hold down the second terminal 42 of the illuminant 40 on the flat rectangular base frame 61. Therefore, the illuminant 40 and the metal conductive member 60 are electrically connected.

Referring to FIG. 1 again, the top lid 70 is pivotally connected with one end thereof to the base 10 by a pivot 71, and adapted to close the top open side of the base 10 and to further protect the compass body 20 against external bodies. The user may open the top lid 70 from the base 10 to read the indication of the magnetic needle 22 of the compass body 20 through the view window 122 of the top cover 12 of the base 10. Further, a biconvex lens 72 is mounted in the top lid 70.

As indicated above, the metal conductive member 60 holds down the battery set 30 in the battery chamber 116, therefore the battery set 30 is constantly maintained in positive contact with the metal conductive member 60. When the user pressed the push button 50 to force the first terminal 41 of the illuminant 40 into contact with the positive terminal of the battery set 30, electricity is provided to the illuminant 40, thereby causing the illuminant 40 to emit light toward the periphery of the compass body 20.

What is claimed is:

1. A magnetic compass comprising:

a base having a hollow base body and a top cover covering said hollow base body, said hollow base body having a receiving chamber, a top opening in a top side of said receiving chamber, a battery chamber, a battery insertion opening in a top side of said battery chamber, and an illuminant chamber in communication between said receiving chamber and said battery chamber, said top cover closing said top opening of said hollow base body, said top cover having a view window corresponding to said receiving chamber and a through hole corresponding to said battery chamber;

a compass body situated within said receiving chamber of said hollow base body of said base, said compass body having a housing, a magnetic needle pivotally mounted within said housing, and an indication card mounted in said housing;

a battery set mounted within said battery chamber, said battery set having a first terminal thereof aimed at said battery insertion opening and a second terminal;

an illuminant situated within said illuminant chamber and aimed at a periphery of said compass body, said illuminant having a first terminal suspended in said battery insertion opening and a second terminal;

a push button supported on the first terminal of said illuminant above said battery chamber and partially inserted through the through hole of said top cover to the outside of said base for pressing by the user to force the first terminal of said illuminant downwards into contact with the first terminal of said battery set; and a top lid pivotally connected with one end thereof to said base by a pivot for covering said base, said top lid having a biconvex lens mounted therein;

wherein said hollow base body further comprises a locating chamber disposed at one side of and in communication with said battery chamber; said magnetic compass further comprises an electrically conductive member for connecting one terminal of said battery set to the second terminal of said illuminant, said conductive member having a base frame mounted in said locating chamber, and a contact portion extended from said base frame and inserted into said battery chamber and pressed on the second terminal of said battery set; the second terminal of said illuminant is electrically connected to said base frame of said conductive member.

2. The magnetic compass as claimed in claim 1, wherein said conductive member further comprises two protruding strips respectively upwardly extended from two opposite lateral sides of said base frame and respectively stopped against one side of said locating chamber at one side to force said base frame against an opposite side of said locating chamber.

3. The magnetic compass as claimed in claim 1, wherein said conductive member further comprises a locating strip outwardly extended from a top side of said flat rectangular base frame and curved backwards to hold down the second terminal of said illuminant on said flat rectangular base frame.

4. The magnetic compass as claimed in claim 1, wherein said contact portion of said conductive member is upwardly outwardly extended from a bottom of said base frame and smoothly arched.

* * * * *